US005580454A

United States Patent [19]
Zaiter

[11] Patent Number: 5,580,454
[45] Date of Patent: Dec. 3, 1996

[54] BACKWASHING FILTER WITH INCREASED FILTRATION SURFACE AREA

[76] Inventor: Sohail Zaiter, 24 Old Farm Rd., Randolph, Mass. 02368

[21] Appl. No.: 552,598

[22] Filed: Nov. 3, 1995

[51] Int. Cl.⁶ ................................................. B01D 29/44
[52] U.S. Cl. .................... 210/323.2; 210/346; 210/487; 210/488; 55/278
[58] Field of Search ................... 55/278; 210/323.2, 210/346, 486, 487, 488

[56] References Cited

U.S. PATENT DOCUMENTS

| | | | |
|---|---|---|---|
| 3,334,750 | 8/1967 | Ullman, Jr. | 210/486 |
| 4,686,041 | 8/1987 | Van Der Berg et al. | 55/278 |
| 4,726,900 | 2/1988 | Keskinen et al. | 55/278 |
| 4,774,000 | 9/1988 | Kawai et al. | 210/488 |
| 5,213,684 | 5/1993 | Drori | 210/486 |
| 5,296,134 | 3/1994 | Zaiter | 210/489 |

Primary Examiner—W. L. Walker
Attorney, Agent, or Firm—Brian L. Michaelis

[57] ABSTRACT

A backwashable filtration system comprises a plurality of filter cartridges each consisting of a column of stacked arcaded wafers disposed on a rigid geometric guide rod. The wafers have arcuate portions interconnected by straight portions to form a filtration portion. An upper and lower surface of the filtration portion has grooves disposed therein. The filtration portion is connected, via a plurality of tabs, to a mounting portion having an inner hexagonal cavity and a circular exterior. The inner hexagonal cavity is tightly toleranced to fit onto the rigid hexagonal guide rod so as to preclude rotation of the wafers about the rod. The relationship of the inner hexagonal cavity to the outer filtration portion ensures that the arcs will always align to each other and that the grooves on a top surface of a wafer will be offset from grooves on the bottom surface of an opposed wafer. Integral passages accommodate flow of filtrate to a clean chamber and accommodate the flow of backwash fluid through the stack.

13 Claims, 4 Drawing Sheets

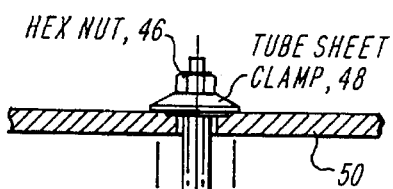
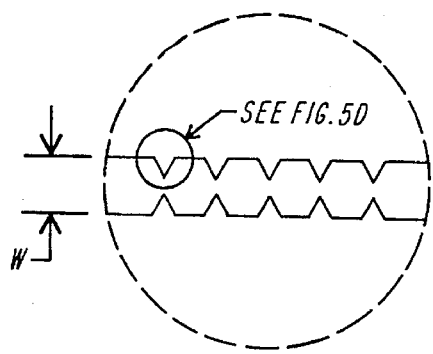
FIG. 5C
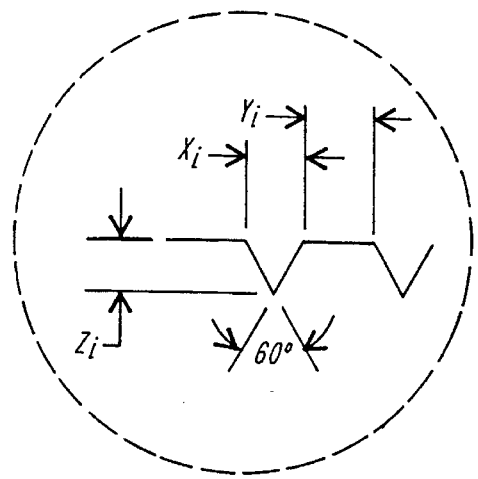
FIG. 5D
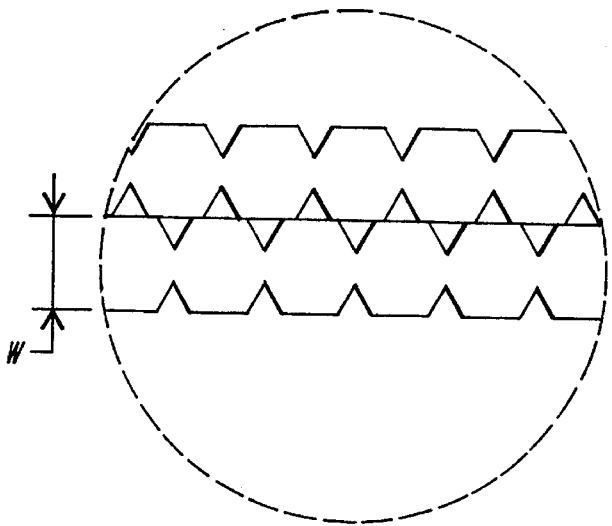
FIG. 6
FIG. 7

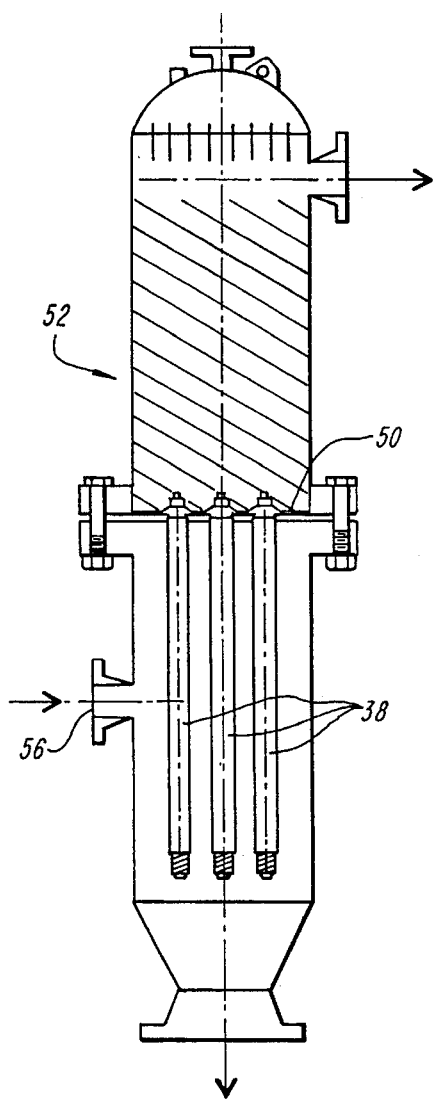
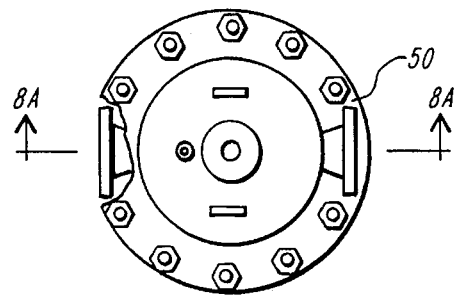
FIG. 8B
FIG. 8A
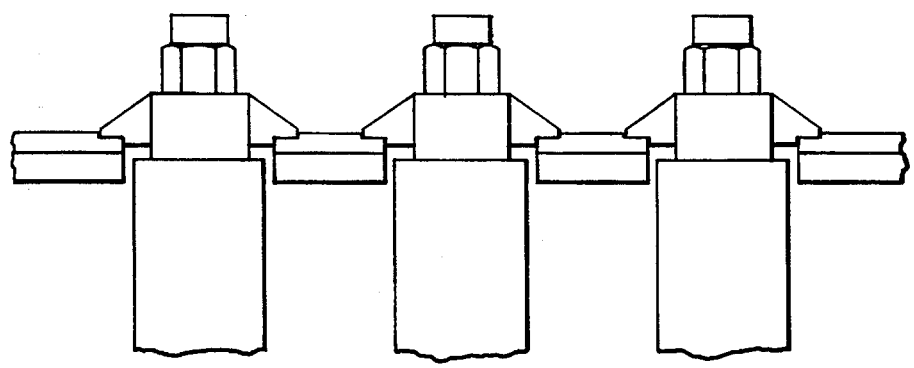
FIG. 8C

BACKWASHING FILTER WITH INCREASED FILTRATION SURFACE AREA

FIELD OF THE INVENTION

The present invention relates to filters for removing particular matter from a fluid stream, and more particularly to a backwashable filtration mechanism including a plurality of stacked wafers having increased surface area for trapping and filtering particulate matter.

BACKGROUND OF THE INVENTION

Filtration systems are known which are comprised of filter elements that are a stack of serrated annular wafers held in compression by a biasing spring. The wafers include grooves molded into faces thereof forming passages between an outer portion and an inner portion. In a stacked configuration the wafers form a cylindrical filter element constituted by a radial labyrinth of passages which trap particles from fluid that flows between an outer surface formed by a plurality of outer portions of the stacked wafers and an inner surface formed by a plurality of inner portions of the stacked wafers.

One such system, as disclosed in U.S. Pat. No. 5,296,134 ("the '134 patent"), includes wafers stacked on a vertical guide that consists of three equiangularly disposed ribs. The wafers have their inner portions configured as a circular geometry dimensioned to fit snugly onto the vertical guide ribs forming an interior flow path in the interior of the column of stacked wafers. The circular inner portion of the wafers, although dimensioned for a snug fit, is free to rotate about the vertical guide ribs. Such a configuration, disadvantageously, permits mis-alignment of the wafers in the stack. This disadvantageous mis-alignment creates exposed surfaces that can become worn or broken, deteriorating the wafers and reducing the efficiency of the filtration mechanism.

The guide ribs of the '134 patent effect a flow path at the interior of the stacked wafers for filtrate, i.e. the fluid that has passed from the outer surface through to the inner surface having been filtered as it passed therethrough. The interior flow path not only acts as a conduit for filtrate to flow to a clean chamber, i.e. a repository for clean/filtered fluid, the interior flow path also acts as a backwash fluid flow path for fluid used to backwash the filter. When subject to a pressure surge, for instance resulting from clogged outer surfaces of the filter stack or from preferential flow of backwash fluid, extreme radial forces on the guide ribs can contort or permanently distort the vertical guide. Even minor contortions due to pressure surges acting on the vertical guide support ribs will result in filter element separation and inefficient filtration.

Prior art filtration systems, such as disclosed and claimed in the '134 patent, rely on the surface area of the wafers to trap particles and effect filtration. Therefore, the greater the surface area of the wafer, and overall filter element, the greater the efficiency of the filter. Throughput, i.e. the amount of filtrate processed, is also a function of the filtration efficiency or surface area. The stacked circular wafers with angularly disposed passages in systems such as in the '134 patent offer limited opportunities to increase surface area. Molding tolerances preclude significant increases in the density of passages, i.e. by reducing spacing therebetween. The possibilities for substantially increasing surface area which could result in substantial increases in throughput and/or reductions in filter size are very limited in prior art filter configurations.

Furthermore, prior art filtration systems such as in the '134 patent are mechanically arranged as a stack of wafers disposed between an upper and lower assembly plate. The lower assembly plate, while stabilizing the stack and somewhat overcoming the deficiencies of the fairly flimsy vertical guide rod, presents an impediment to the removal of filter cakes and particles during backwash. The lower assembly plate in prior art filtration systems is disposed directly in the path of backwash flow restricting such flow and preventing efficient cleaning of the filter.

SUMMARY OF THE INVENTION

The present invention provides a backwashable filter and media with a high ratio of open area to total surface area to effect high throughput and high efficiency filtration. The high ratio of open area to total surface area of the filter and media is achieved by arcaded surfaces having a serpentine configuration of grooves disposed thereon. The filter and media are designed to maintain geometric integrity during prolonged service life and are capable of filtering suspended particles of various sizes.

According to the invention, a backwashable filtration apparatus comprises a plurality of filter cartridges each consisting of a column of stacked arcaded wafers disposed on a rigid geometric guide rod. Each of the arcaded wafers is comprised of a plurality of arcuate portions interconnected by a plurality of interspersed straight portions to form a filtration portion. The filtration portion has an outer surface, an inner surface, an upper surface and a lower surface. Each of the upper surface and the lower surface has disposed therein a plurality of grooves. The grooves on the surfaces are disposed radially at an angle, i.e. they are not radially straight. When two wafers are stacked on top of each other, interfacing or opposed grooves are mirror images in terms of groove orientation. As such, the grooves cross each other as opposed to being aligned.

The filtration portion is connected, via a plurality of tabs, to a mounting portion having an inner geometric cavity and an outer circular surface. The inner geometric cavity is tightly toleranced and matched to fit onto the rigid geometric guide rod precluding rotation of the wafers about the rod and maintaining offset between grooves on opposed surfaces in a stack. The relationship of the inner cavity to the outer filtration portion ensures that the arcaded surfaces will always align to avoid overlapping or exposed surfaces that can become worn, break and diminish filtration efficiency.

The plurality of tabs, the outer circular surface of the mounting portion and the inner surface of the filtration portion are configured to form a plurality of integral passageways. In the column of stacked arcaded wafers disposed on the rigid guide rod, the plurality of integral passages accommodate the flow of filtrate to a clean chamber and accommodate the flow of backwash fluid through the stack. The rigid guide core is rigid enough to withstand high radial forces and the integral passages reduce the potential for preferential flow of backwash fluid. Avoidance of preferential flow is a significant feature that ensures uniformity of flow of backwash fluid throughout the wafers in the stack.

In one embodiment of the invention, the backwashable filtration apparatus is implemented having a filter vessel consisting of an upper and a lower chamber bolted together at mid span using a flange arrangement. The lower filter chamber houses the plurality of filter cartridges, while the upper chamber forms a self contained backwash reservoir. The backwash reservoir supplies the fluid for backwash without the need for an external fluid source. Backwash fluid is stored in the reservoir along with, or alternatively as, a pressurization media such as air to pressurize the reservoir and provide high pressure fluid to backwash or clean the filter media. In such an embodiment, each filter cartridge or stack is held in suspension from a perforated filter plate, which can hold a large number of such stacks. The stacks are held in sealed position via a tube clamp, which acts to compact the stack and seal it against the filter plate. No lower plate is implemented to impede backwash flow, therefore, efficient cleaning of the cartridge assembly is effected during the backwash cycle.

Features of the invention in a preferred embodiment include filter media designed to maintain geometric integrity during prolonged service life rendering it to almost permanent media class. A heavy duty, durable cartridge filter assembly includes wafers having an inner hexagonal cavity configured around a solid hexagonal guide rod that withstands higher radial forces to preserve cartridge integrity. Wafer shape and geometric arrangement can be configured to include circular outside envelope sizes of a diameter from at least 1.0 inches to at least 4 inches. Increased surface area of approximately 54% over prior art wafers and systems can be achieved. Increased surface area results in an increased flow capacity directly proportional to the increased surface area. Filter size can be approximately 54% smaller while achieving at least the same filtration rating of some prior art systems. Filtration systems according to the invention may be less expensive to manufacture, as the size of such systems may be reduced by approximately 50% while still providing enhanced filtration efficiency. The mechanical assembly of the individual cartridges in the context of a filtration system ensures efficient cleaning and a higher filtration rating. Various sized particles, including particles ranging between at least one micrometer and fifty micrometers can be filtered.

BRIEF DESCRIPTION OF THE DRAWING

These and other features and advantages of the present invention will be better understood when reading the following detailed description, taken together with the following drawing in which:

FIG. 5C is a sectional view taken along the line B—B on the wafer of FIG. 4;

FIG. 5D is a detail view of a groove isolated from FIG. 5A;

FIG. 6 is a side view of two stacked wafers according to the invention showing non-alignment of grooves ensured by the relationship of the hexagonal cavity and the filtration portion;

FIG. 7 is a side view of a filter cartridge and hardware engaged in a filter plate according to the invention;

FIG. 8A is an elevation view of a filter vessel including a plurality of filter cartridges according to the invention;

FIG. 8B is a plan view of a perforated filter plate supporting filter cartridges in the filter vessel of FIG. 8A; and FIG. 8C is a side section view of the perforated filter plate of FIG. 8B showing a tube clamp fastening implementation.

DETAILED DESCRIPTION

Figure 1:
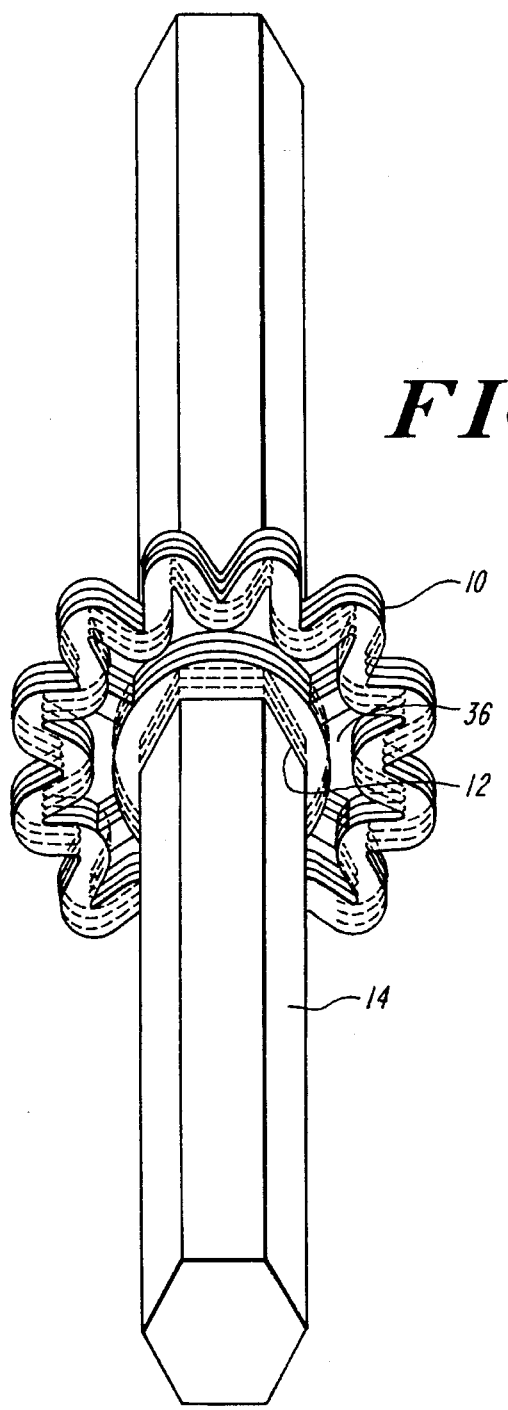
FIG. 1 is a perspective view of a partial stack of filtration wafers according to the invention.

As illustrated in FIGS. 1–7, a filtration apparatus according to the invention is comprised of at least one filter cartridge which is in turn comprised of a plurality of stacked arcaded wafers 10. As generally illustrated in FIG. 1, the arcaded wafers 10 have a geometric construction including a tightly toleranced hexagonal center guide cavity 12 effecting uniform disposition of the wafers 10 on a hexagonal guide rod 14. The wafers 10 are configured to preclude rotation about the guide rod 14. The guide rod 14 is formed of high strength, durable metal that can withstand substantial radial forces in an assembly having a plurality of filter cartridges constituting a filtration apparatus as discussed hereinafter.

Each arcaded wafer is formed, i.e. molded of an injectable thermoplastic. The thermoplastic composition may be altered for certain applications by adding fillers such as glass beads or talcum or the like. Different applications may dictate different ratios of filler to thermoplastic in order to enhance performance and durability.

Figure 2:
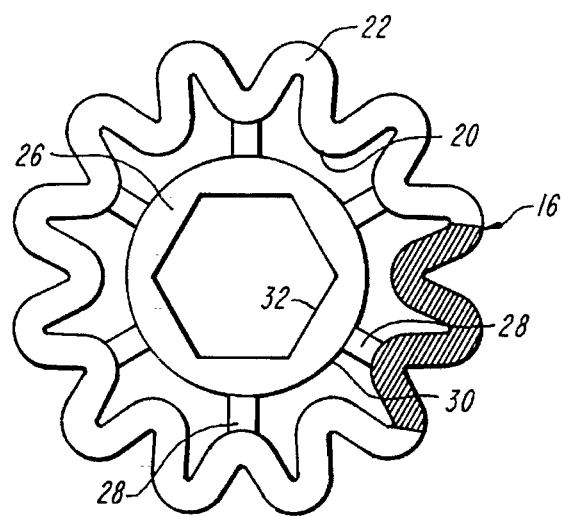
FIG. 2 is a plan view of a filtration wafer according to the invention.
Figure 3:
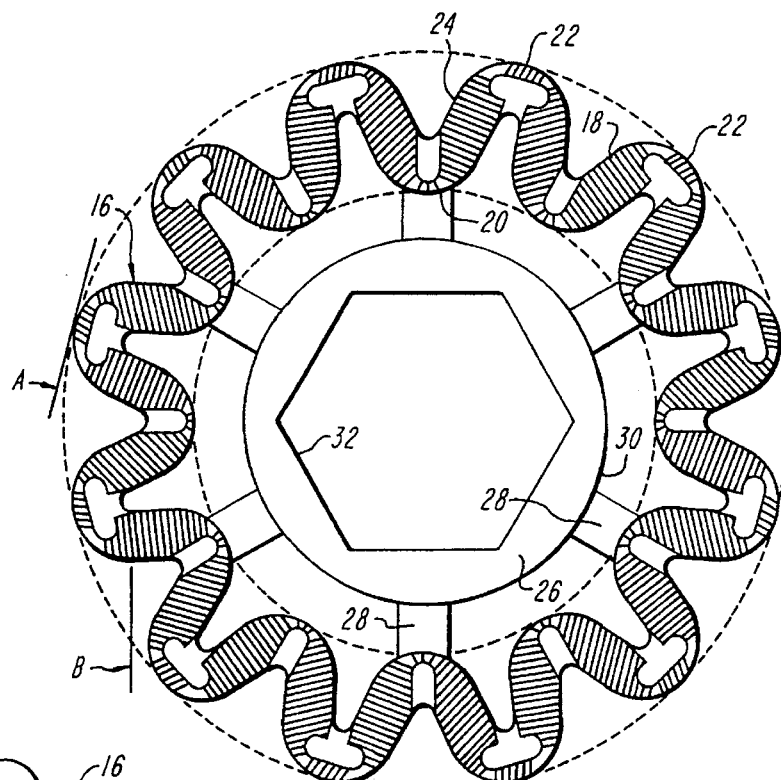
FIG. 3 is a plan view of a filtration wafer according to the invention showing surface grooves on the arcuate portion thereof.

As illustrated in FIGS. 2 and 3, each wafer includes a filtration portion 16 comprised of twelve interior arc surfaces 20 and twelve exterior arc surfaces 22. Each interior arc 20 and adjacent exterior arc is interconnected by a straight portion 24. Outside surfaces of the exterior arc surfaces circumscribe an outside envelope, which in the illustrative embodiment, has a diameter of 1.5 inches. Various sized outside envelopes are possible. There are twenty-four straight portions 24 interconnecting the twelve interior arc surfaces 20 and twelve exterior arc surfaces 22. In this illustrative configuration, the straight portions 24 facilitate the inclusion of a maximum number of arc surfaces in order to maximize surface area on which to dispose grooves.

Figure 4:
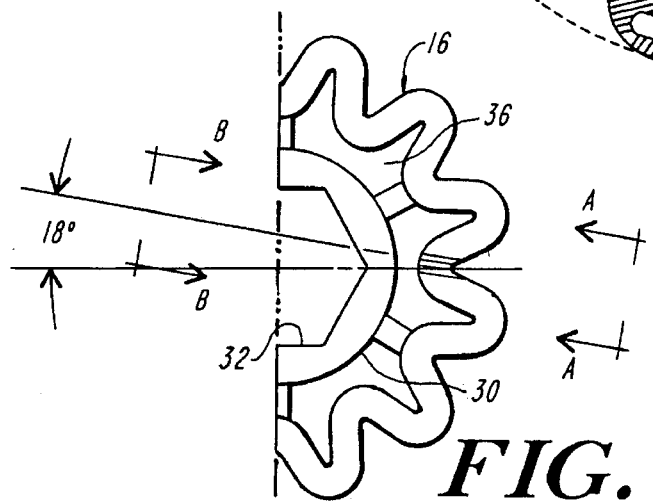
FIG. 4 is a partial view of the filtration wafer of FIG. 2.
Figure 5A:
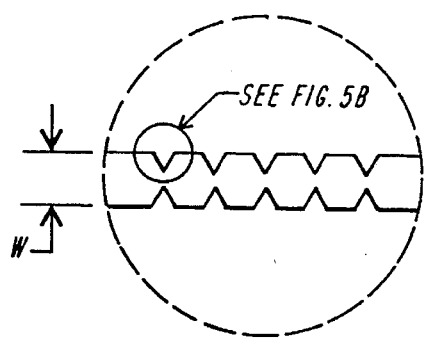
FIG. 5A is a sectional view taken along the line A—A on the wafer of FIG. 4.
Figure 5B:
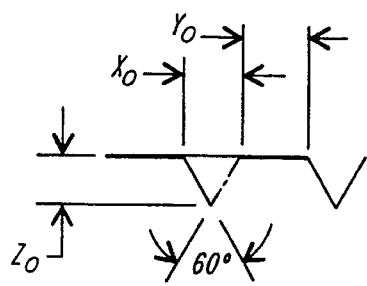
FIG. 5B is a detail view of a groove isolated from FIG. 5A.

All of the interior arc surfaces., exterior arc surfaces and straight portions include very fine passage grooves 18 (See FIG. 3). The passage grooves 18 are etched on both sides of the filtration portion of each wafer, i.e. on upper and lower surfaces of the filtration portion. Illustrative groove characteristics are shown in FIGS. 4–6 and detailed in Table 1. A significant consideration for the grooves molded into the wafer surfaces is that they are disposed radially at an angle, i.e. they are not radially straight. In the illustrative embodiment the grooves are disposed at an angle approximately 18 and 20 degrees with respect to a line (A in FIG. 3) perpendicular to a diameter line through the center of an exterior (or interior) arc of the wafer, in the case of grooves on an outer edge of the exterior (or interior) arcs. Other grooves are disposed approximately 18 to 20 degrees with respect to a line (B in FIG. 3) perpendicular to the straight portion(s) interconnecting each of the arcs.

TABLE 1

| EXAMPLE OF GROOVE SIZES | | |
|---|---|---|
| DIMENSION | 10 MICRON | 40 MICRON |
| $X_a$ | .004–.0046 | .009–.010 |

TABLE 1-continued

EXAMPLE OF GROOVE SIZES

| DIMENSION | 10 MICRON | 40 MICRON |
|---|---|---|
| $Y_o$ | .0055–.0062 | .0045–.005 |
| $Z_o$ | .0035–.004 | .0075–.0089 |
| $X_i$ | .0048–.0057 | .0095–.011 |
| $Y_i$ | .00175–.0022 | .004–.0045 |
| $Z_i$ | .0041–.0049 | .0082–.0095 |

As illustrated in FIGS. 2 and 3, the filtration portion 16 is connected to a mounting portion 26 via six tabs 28 that are directly connected to an outer circular surface 30 of the mounting portion 26. The outside diameter of the outer circular surface 30 is 0.750 inches. The mounting portion 26 includes an inner hexagonal cavity 32. The dimension of the inner hexagonal cavity 32 in this illustrative embodiment is 0.525 inches across its flats, which corresponds to the outer dimension of the hexagonal guide rod 14.

The tabs 28 are connected to the outer circular surface 30 of the mounting portion 26, and configured to be perpendicular to the flats of the inner hexagonal cavity 32. The orientation of the hexagonal cavity 32 and the arcs of the filtration portion are interrelated. The tabs 28 are connected to the inner surface of every other interior arc surface 20, so that the arcs will always align to each other when they are stacked on the hexagonal guide rod 14. The tabs have a thickness dimension that is less than the thickness of the filtration portion and mounting portion, to permit free flow of filtrate into integral passageways.

Six integral passageways 36 are formed internal to the filtration portions 16 of the wafers when they are stacked, e.g. in a vertical manner on the hexagonal guide rod 14. The passageways 36 are formed by the tabs, the outer circular surface 30 of the mounting portion 26, and the inner surface of the filtration portion 16. The integral passageways 36 serve the essential role of creating flow paths to transport the filtrate, i.e. clean fluid, to a clean chamber of a filtration system. In addition to accommodating the flow of filtrate to the clean chamber, the integral passageways 36 accommodate the flow of backwash fluid through the stack when the filtration system is in a backwash mode. The integral passageways 36 effect an unimpeded path for filtrate and backwash fluid that does not subject the guide rod 14 to substantial unbalanced forces, reducing the likelihood of contortion of the rod and wafer stack.

The configuration of the wafers described hereinbefore represents an increase in total surface area of approximately fifty four percent (54%) over prior art wafers (such as disclosed in the '134 patent discussed hereinbefore). The surface area, i.e. the outer surface area of the filtration portion that is exposed to fluid for filtration, is key in that it will trap particles as the fluid flows through open areas created by the grooves in the wafers. For example, the surface area of the '134 patent wafer is represented by the circumference of the wafer (pi×diameter):

CIRCUMFERENCE=3.1416 [$pi$]×1,375 [wafer outer diameter]= 4.3197"

Whereas, the surface area of the wafers according to the invention is greater than that of the circular wafer of the prior art in that the surface area of the wafer according to the invention is equal to a "circumference" that is effectively the sum of each of the arcuate surfaces on the outer surface of the filtration portion plus the interspersed straight portions. The circumference of the wafer according to the invention is computed as follows:

(1) CIRCUMFERENCE=(ARC1+ARC2)×12 +24× STRAIGHT PORTION (2) ARC1=RADIUS×INCLUDED ANGLE×3.1416/ 180=0.1125×156×3.1416/180=0.3063"

(3) ARC2=0.0125×116×3.1416/180=0.0253"

(4) CIRCUMFERENCE=0.3063×12+0.0253×12+ 0.1113×24=6.6506"

Thus, the increase in circumference is obtained by subtracting the prior art circumference from the circumference of the wafers according to the invention:

INCREASE IN CIRCUMFERENCE=6.6506–4.3197=2.3309=54% INCREASE

Furthermore, the open area, i.e. the openings created by the grooves through which fluid can flow, has also increased by approximately a 3 to 1 ratio because there are significantly more grooves in the wafer according to the invention as a result of the increased surface area. For example a 20 micron wafer according to the dimensions provided in the '134 patent has approximately 250 grooves. By contrast, the wafer according to the invention has approximately 850 grooves, representing a threefold increase in open area. The increased open area translates into a greater flow rate or throughput, i.e. increased by approximately three hundred percent (300%).

A plurality of wafers according to the invention are configured in a stack as an individual cartridge assembly 38, such as illustrated in FIG. 7, by fitting the hexagonal cavity of each wafer on the precisely shaped hexagonal guide rod 14. Stacked on top of each other, the wafers all have their outer arcuate surfaces aligned. In the illustrative embodiment, the hexagonal guide rod 14 is an integral part of a cartridge mechanical arrangement comprised of the rod 14, a lower support face 40, a spring 42, a compression plate 44 and a hex nut 46. A tube sheet clamp 48 and the hex nut 46 attach the cartridge 38 to an upper suspension plate 50 of a filtration system.

As illustrated in FIGS. 8A–8C, in the filtration system 52 according to the invention, a plurality of cartridges 38, as described, are held in suspension from the upper suspension plate 50. The rigid hexagonal guide rod 14 is threaded at an end thereof to receive the tube sheet clamp 48 and the hex nut 46 to attach the cartridge 38 to the upper suspension plate 50. The wafers are held in compression on the hexagonal guide rod 14 by the spring 42 which biases the compression plate 44 against the wafers. The rigid hexagonal rod 14, which is preferably solid, maintains the cartridges rigidly fastened to the upper suspension plate so as not to require a lower plate hung from the upper plate by tie rods to support the cartridges as in the prior art. The elimination of the lower plate and tie rods enhances the backwash cycle providing for enhanced cleaning of the cartridges and ultimately contributing to a much higher efficiency filtration system as compared to prior art systems.

The filtration system, best illustrated in FIG. 8A, comprises a filter vessel 60 having an upper chamber constituting a reservoir portion 64 and a lower chamber constituting a cartridge housing 66. The reservoir portion provides a backwash fluid reservoir to supply the fluid necessary for backwash without requiring a constant external fluid source. The backwash reservoir preferably is configured having high pressure seals and interconnections in order to contain fluid under high pressure. The fluid used in backwash may be a liquid or gas, or a combination thereof.

The cartridges 38 are suspended from the upper suspension plate 50 and disposed within the lower chamber of the vessel 52. The suspension plate 50 is perforated for receiving the cartridge guide rods and for passing filtrate and backwash fluid. The suspension plate 50 is preferably supported at mid span of the vessel in a position where the upper and lower chambers are fastened together by an appropriate flange or fastening arrangement, for ease of removal for service or replacement.

Fluid to be subject to filtration enters the vessel at an inlet port 56 at the lower chamber. Such fluid can be under relatively high pressure, as the solid hexagonal guide core of the cartridges is rigid enough to withstand high radial forces. Filtration takes place when fluid passes through the grooves in the wafer stack in a radial direction. Suspended particles will be stopped at the outer surface of the wafers, either by direct interception, or by the formation of a dynamic filter normally referred to as a filter cake.

Filtrate passes through the grooves into the integral passageways 36 which serve the essential role of creating flow paths to transport the filtrate, i.e. clean fluid, to the upper chamber. In addition to accommodating the flow of filtrate to the clean chamber and the integral passageways 36 accommodate the flow of backwash fluid through the stack when the filtration system is in a backwash mode.

Cleaning of the filter cartridges is achieved during a backwash cycle by introducing backwash fluid into the integral passageways. The backwash fluid is introduced under high pressure so that it pressurizes the interior of the cartridges and compresses the spring 42 which permits separation of and cleaning between the individual wafers. The backwash fluid may be high pressure gases which could include air or nitrogen, or it could be filtrate pressurized in a reverse flow direction. Separation of the wafers during backwash for an adequate time period will effect cleaning of the cartridges, forcing trapped and caked particles out of the filter cartridges and out a drain in the lower chamber.

Although the guide rod described in the illustrative embodiment hereinbefore is a high strength solid metal hexagonal rod, it will be appreciated that the guide rod, depending upon the application and fluids involved, could be formed of materials other than metal, such as advanced composites, nylon, polyvinylchloride or the like. Similarly, the guide rod could be hollow as opposed to a solid structure, and could be geometrically configured as other than hexagonal, or only partially geometrically configured, to effect the purpose of retaining the wafers disposed thereon in a rotationally fixed position. Likewise, the composition of the wafers may be a function of the application and the fluids involved.

While the filtration system described herein includes a plurality of cartridges held in suspension from a single upper suspension plate, it should be appreciated that filtration systems can be implemented according to the invention wherein an upper plate is used that accommodates only a single wafer stack. It should also be appreciated that the cartridges do not necessarily have to be suspended vertically or held in parallel position. Other orientations, such as horizontal positioning and/or cartridges positioned in series with progressively smaller particle filtration capacities are envisioned.

Although the invention has been shown and described with respect to an exemplary embodiment thereof, it will be appreciated that the foregoing and various other changes, additions and omissions in the form and detail thereof may be made therein without departing from the spirit and scope of the invention.

What is claimed is:

1. A filtration medium arranged to be disposed on a geometric guide member with a plurality of like filtration media disposed in a stack, comprising:

a mounting portion having an inner cavity dimensioned to be rotationally fixed on said geometric guide member, said mounting portion having an external surface;

a plurality of tabs each having a first end and a second end, said first end of each of said plurality of tabs being attached to said external surface of said mounting portion;

a filtration portion attached to said second end of each of said plurality of tabs said filtration portion comprising a plurality of interior arcs, a plurality of exterior arcs, and said filtration portion having a first surface and a second surface each having a plurality of grooves disposed therein, said plurality of interior arcs comprising an inner surface facing said external surface of said mounting portion having said second end of each of said plurality of tabs attached thereto; and at least one integral passageway formed by a surface of a respective one of said plurality or tabs, said external surface of said mounting portion and said inner surface of said filtration portion, said at least one integral passageway forming a fluid path for fluid to flow internal to said mounting portion of said medium in said stack of said plurality of like filtration media.

2. The filtration medium of claim 1 wherein said inner cavity is hexagonal in shape to fit rotationally fixed on said geometric guide member when the geometric guide member is constituted by a hexagonal rod.

3. The filtration medium of claim 1 wherein said filtration portion comprises a plurality of interior arcs, a plurality of exterior arcs and a plurality of straight portions disposed between respective ones of said plurality of interior arcs and exterior arcs.

4. The filtration medium of claim 2 wherein said filtration portion comprises a plurality of interior arcs, a plurality of exterior arcs and a plurality of straight portions disposed between respective ones of said plurality of interior arcs and exterior arcs, and wherein said at least one tab comprises a plurality of tabs, said second end of respective ones of said plurality of tabs being connected to interior arcs at said inner surface of said filtration portion and said first end of respective ones of said plurality of tabs being connected to said external surface of said mounting portion, each of said second ends of said tabs being connected to said external surface of said mounting portion in a position perpendicular to a flat portion of said hexagon of said inner cavity, and a respective first end of each of said plurality of tabs being connected to every other interior arc at said inner surface of said filtration portion.

5. The filtration portion of claim 1 wherein said at least one tab has a thickness dimension that is less than a thickness dimension of said mounting portion and said filtration portion.

6. The filtration medium of claim 1 wherein said filtration portion comprises twelve exterior arcs which circumscribe a circle having a diameter in a range of approximately 1 inches to approximately four inches, and twelve interior arcs, each interior arc connected to an adjacent exterior arc by a straight portion, and wherein said at least one tab comprises six tabs with one tab connected at every other interior arc of said filtration portion, and wherein said at least one integral passageway comprises six integral passageways formed between said external surface of said mounting portion and said inner surface of said filtration portion.

7. A filter cartridge formed of a plurality of stacked filtration media as defined in claim 1.

8. The filter cartridge of claim 7 comprising an individual compression plate and a respective support plate disposed at a first end thereof with a compression spring disposed between said compression plate and said support plate, and an upper plate disposed at a second end thereof with a plurality of said filtration medium disposed in compression between said compression plate and said support plate.

9. A filtration apparatus including at least one filter cartridge as defined in claim 8.

10. The filtration apparatus of claim 9 comprising a vessel having a first portion and a second portion and wherein said upper plate is a mounting plate for mounting said at least one filter cartridge, and wherein said first portion is attached to said second portion with said mounting plate disposed having said at least one filter cartridge extending into said second portion, and wherein said first portion provides a reservoir for storing fluids after being filtered by said at least one filter cartridge and for storing backwash fluid for backwashing said at least one cartridge.

11. The filtration medium of claim 1 wherein said medium is formed of thermoplastic.

12. The filtration medium of claim 11 wherein said medium is formed of thermoplastic having fillers incorporated therein.

13. The filtration medium of claim 1 wherein each of said plurality of grooves has a triangular cross-section.

* * * * *